(12) United States Patent
Yung et al.

(10) Patent No.: US 9,543,786 B2
(45) Date of Patent: Jan. 10, 2017

(54) PORTABLE POWER SYSTEM

(71) Applicant: V5 Systems, Inc., Fremont, CA (US)

(72) Inventors: Steven K. Yung, Newark, CA (US); Yuck Ming Chiu, Newark, CA (US)

(73) Assignee: V5 SYSTEMS, INC., Fremont, CA (US)

( * ) Notice: Subject to any disclaimer, the term of this patent is extended or adjusted under 35 U.S.C. 154(b) by 0 days.

(21) Appl. No.: 14/526,348

(22) Filed: Oct. 28, 2014

(65) Prior Publication Data

US 2015/0115898 A1 Apr. 30, 2015

Related U.S. Application Data

(60) Provisional application No. 61/896,587, filed on Oct. 28, 2013, provisional application No. 62/054,858, filed on Sep. 24, 2014.

(51) Int. Cl.
*H02M 3/07* (2006.01)
*H02J 7/34* (2006.01)
*H02J 7/00* (2006.01)
*H02J 7/35* (2006.01)

(52) U.S. Cl.
CPC .............. *H02J 7/345* (2013.01); *H02J 7/0013* (2013.01); *H02J 7/0021* (2013.01); *H02J 7/34* (2013.01); *H02J 7/35* (2013.01)

(58) Field of Classification Search
CPC ..................................................... H02J 7/0091
USPC ........................................................ 320/152
See application file for complete search history.

(56) References Cited

U.S. PATENT DOCUMENTS

| | | | |
|---|---|---|---|
| 6,961,079 B2 | 11/2005 | Kaylor et al. | |
| 8,531,110 B2 | 9/2013 | Beasley | |
| 8,536,971 B1 * | 9/2013 | Waseem et al. | 336/212 |
| 2002/0177929 A1 * | 11/2002 | Kumar | 701/19 |
| 2003/0214267 A1 | 11/2003 | Long | |
| 2005/0179539 A1 | 8/2005 | Hill et al. | |
| 2006/0028550 A1 | 2/2006 | Palmer et al. | |
| 2006/0176369 A1 | 8/2006 | Meritt | |
| 2006/0209187 A1 | 9/2006 | Farneman | |
| 2006/0279423 A1 | 12/2006 | Nazari | |
| 2007/0052804 A1 | 3/2007 | Money et al. | |
| 2007/0086146 A1 * | 4/2007 | Timmerman et al. | 361/434 |
| 2007/0107028 A1 | 5/2007 | Monroe et al. | |
| 2009/0122143 A1 | 5/2009 | Latham et al. | |
| 2010/0038974 A1 * | 2/2010 | Imperial | 307/150 |
| 2010/0277584 A1 | 11/2010 | Price | |
| 2010/0296238 A1 * | 11/2010 | Mowry et al. | 361/679.53 |
| 2011/0248678 A1 | 10/2011 | Wade et al. | |
| 2012/0133203 A1 | 5/2012 | Lienkamp et al. | |
| 2012/0153728 A1 * | 6/2012 | Athas et al. | 307/80 |
| 2012/0161690 A1 * | 6/2012 | Henness | 318/767 |
| 2012/0161730 A1 * | 6/2012 | Farnsworth | 323/272 |
| 2013/0002469 A1 * | 1/2013 | Kull | 341/172 |
| 2013/0266826 A1 * | 10/2013 | Cowperthwaite et al. | 429/7 |

* cited by examiner

*Primary Examiner* — Drew A Dunn
*Assistant Examiner* — Jerry D Robbins

(57) ABSTRACT

A power management system and method are disclosed. The system can be a high availability power delivery system. The system can be GPS tracked. The system can have multiple batteries, multiple input power sources, and multiple loads. The system can switch between the multiple batteries and the power source to deliver power to the load. The system can ensure there will always be an input power source to power the load.

20 Claims, 21 Drawing Sheets

|     | FULL | LOW | ON | OFF | CHARGING |
|-----|------|-----|----|----|----------|
| B1  | X    |     |    |    |          |
| B2  |      | X   |    |    |          |
| S1  |      |     |    | X  |          |
| S2  |      |     | X  |    |          |
| BC1 |      |     |    |    | OFF      |
| BC2 |      |     |    |    | ON       |

FIG. 6a

|     | FULL | LOW | ON | OFF | CHARGING |
|-----|------|-----|----|----|----------|
| B1  |      | X   |    |    |          |
| B2  | X    |     |    |    |          |
| S1  |      |     | X  |    |          |
| S2  |      |     |    | X  |          |
| BC1 |      |     |    |    | ON       |
| BC2 |      |     |    |    | OFF      |

FIG. 7a

|     | FULL | LOW | ON | OFF | CHARGING |
|-----|------|-----|----|----|----------|
| B1  |      | X   |    |    |          |
| B2  |      | X   |    |    |          |
| S1  |      |     | X  |    |          |
| S2  |      |     | X  |    |          |
| BC1 |      |     |    |    | ON       |
| BC2 |      |     |    |    | ON       |

FIG. 8a

|     | FULL | LOW | ON | OFF | CHARGING |
|-----|------|-----|----|-----|----------|
| B1  | X    |     |    |     |          |
| B2  | X    |     |    |     |          |
| S1  |      |     |    | X   |          |
| S2  |      |     |    | X   |          |
| BC1 |      |     |    |     | OFF      |
| BC2 |      |     |    |     | OFF      |

FIG. 9a

PORTABLE POWER SYSTEM

CROSS-REFERENCE TO RELATED APPLICATIONS

This application claims priority to U.S. Provisional Application No. 61/896,587, filed on Oct. 28, 2013, and 62/054,858, filed on Sep. 24, 2014, the content of which are incorporated herein by reference in their entireties.

BACKGROUND OF THE INVENTION

1. Field of the Invention

A power management system and method are disclosed. The system can be a high availability power delivery system. The system can be GPS tracked.

2. Description of the Related Art

Power management systems are networks of electrical components used for delivery of power to loads. Power systems are intended to condition the power, which is to say that the voltage and current delivered to the loads are regulated to insure consistency of power delivery. Power management systems often condition the power supply before delivery to the load, regulating the delivered current and voltage to suit the load.

Some power management systems have batteries that receive electricity from power inputs. The batteries can then supplement the power inputs, either providing power to the load concurrent with the power inputs, or when the power inputs are turned off or not available, such as a standard Uninterrupted (or Uninterruptible) Power Supply (UPS).

Batteries can only store incoming power at a limited rate. Accordingly, charging subsystems within power management systems may receive electrical power from power sources such as solar panels or a fixed 120 V line (e.g., from a wall outlet connected to a municipal or other governmental utility power supply) faster than the batteries in the power management system can absorb the charge, and some available power will be lost, for example such as heat.

Power management systems may also have no or one battery. The use of a battery at least helps increase power uptime when a usually-dependable power input, such as a power line, fails, but does not account for the power line and the battery. Thus, power delivery failure of these systems still occurs.

Also, power management systems often have a singular type of power output. That is, the power management system may be designed to output electricity at one fixed voltage and one fixed current.

Accordingly, a power management system that can store high rates of power into a backup battery is desired. A power management system with higher-availability (e.g., more uptime) than a typical single-battery system is desired. Furthermore, a power management system with different output voltages and currents to power different types of load current and load voltage demands is desired.

BRIEF SUMMARY OF THE INVENTION

A power management system is disclosed. The power management system can have a first battery having a first battery voltage, a second battery having a second battery voltage, a first capacitor bank attached to the first battery, and a second capacitor bank attached to the second battery. The power management system can have a power management element configured to route current from the first capacitor bank to the first battery when the first battery voltage is less than a first full battery voltage. When the current from the first capacitor bank is routed to the first battery and when the second battery voltage is less than a second full battery voltage, the power management element can be configured to route current from the second capacitor bank to the second battery.

The power management system can have a satellite navigation receiver attached to the system. The power management system can have a power conditioning circuit. The power conditioning circuit can have a DC-to-DC converter configured to output a constant load input current and a constant load input voltage. The power management system can be configured to sense the first battery voltage, the second battery voltage, the current from the first capacitor bank, and the current from the second capacitor bank. The power management system can have a first power source and a third capacitor bank. The first power source can be configured to deliver energy to the third capacitor bank. The power management system can have a first power source configured to deliver energy to the first capacitor bank or the second capacitor bank.

The first capacitor bank can have a first capacitor having a first full capacitor voltage, a second capacitor having a second full capacitor voltage, a third capacitor having a third full capacitor voltage, a fourth capacitor having a fourth full capacitor voltage, and a fifth capacitor having a fifth full capacitor voltage. The first full capacitor voltage, the second full capacitor voltage, the third full capacitor voltage, the fourth full capacitor voltage, and the fifth full capacitor voltage can have the same voltage.

The power management element can have a microprocessor. The power management element can have a comparator. The power management system can have a voltage divider configured to send the current from the first capacitor bank to the first battery in 2.7 V increments. The power management system can have a voltage divider configured to send current from the second capacitor bank to the second battery in 2.7 V increments. The power management system can have a temperature management element and a temperature sensor, wherein the system is configured to be cooled when the system detects a temperature from the temperature sensor greater than an optimal temperature. The temperature management element can have at least one of a peltier junction or a piezo-electric plate.

The power management system can have a first capacitor bank, a second capacitor bank, a first power source configured to deliver energy to the first capacitor bank, and a battery. The second capacitor bank is configured to discharge current to the battery.

The power management system can have a second power source and a third capacitor bank. The third capacitor bank can be configured to receive energy from at least one of the first power source or the second power source. The first power source can have at least one of a solar panel, a wind turbine, or a fixed line. The first capacitor bank is less than or equal to 13.5 V. The power management system can have a satellite navigation receiver attached to the system.

The power management system can have a method for charging a first battery and a second battery. The method can determine a first voltage from the first battery; determine a second voltage from the second battery; route a first current from a first capacitor bank coupled to the first battery when the first voltage is less than a first full battery voltage; and route a second current from a second capacitor bank coupled to the second battery when the second voltage is less than a second full battery voltage. The method can charge a third capacitor bank from a first power source.

The power management system can have a method for charging a first battery and a second battery. The method can charge a first battery with a first capacitor bank; charge a second battery with a second capacitor bank; receive current from a power source to a third capacitor bank; and switch the third capacitor bank with the first capacitor bank when the first capacitor bank is less than an optimal capacitor voltage such that the first capacitor can receive current from the power source and the third capacitor bank can charge the first battery. The optimal capacitor voltage can be from about 0 V to about 2 V.

The power management system can have a method for charging a first battery and a second battery. The method can measure a first voltage from a first power source; measure a second voltage from a second power source; select the first power source or the second power source; receive a first current from the first power source or the second power source by a first capacitor bank; and discharge the current from the first capacitor bank to the first battery or the second battery. The receiving can occur in increments of 2.7 V. The system can select the first power source when the first voltage is greater than the second voltage. The system can manually select the first power source or the second power source by a user.

BRIEF DESCRIPTION OF THE SEVERAL VIEWS OF THE DRAWINGS

FIG. 6a illustrates a variation of a logic table where the first battery can be fully charged and the second battery can have a low charge.

FIG. 7a illustrates a variation of a logic table where the first battery can have a low charge and the second battery can be fully charged.

FIG. 8a illustrates a variation of a logic table where the first battery can have a low charge and the second battery can have a low charge.

FIG. 9a illustrates a variation of a logic table where the first battery can be fully charged and the second battery can be fully charged.

DETAILED DESCRIPTION OF THE INVENTION

Figure 1:
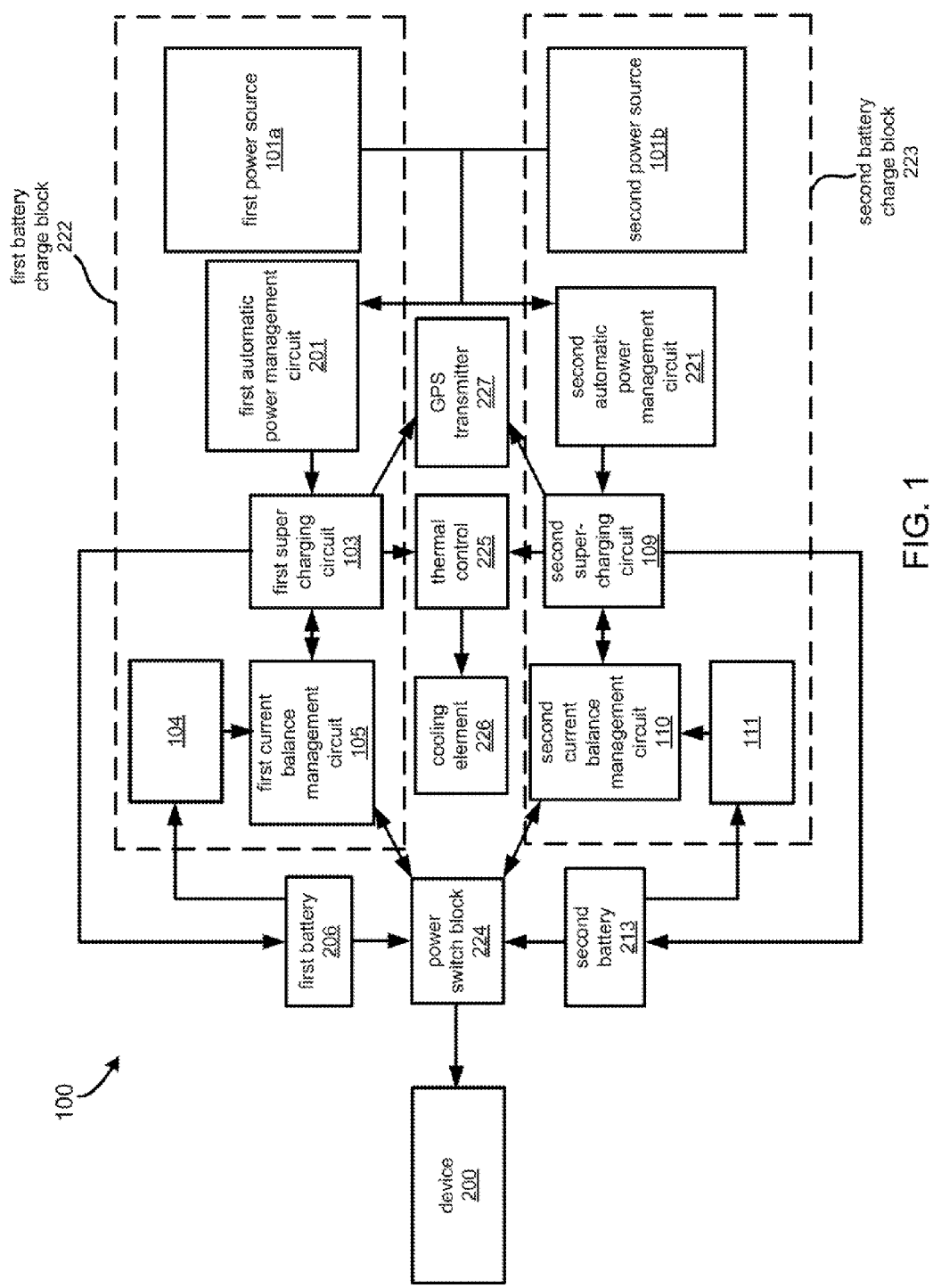
FIG. 1 illustrates a variation of components in a portable power management system.

FIG. 1 illustrates that the power management system 100 can be a high availability (e.g., at least two or more batteries), GPS tracked power management system. The solid lines can represent connections between components. The arrows can represent current flow. The power management system 100 can be portable. The power management system 100 can have a power source, either a first power source 101a or a second power source 101b, a satellite navigation receiver 227, a thermal control 225, a cooling element 226, a power switch block 224, a first battery 206, a second battery 213, a first battery charge block 222, a second battery charge block 223, or any combination thereof.

The power management system 100 can have at least a first power source 101a, a second power source 101b, a third power source, a fourth power source, and/or a fifth power source (the third power source, the fourth power source, and/or the fifth power source are not shown in FIG. 1). The first power source 101a and the second power source 101b can be connected (e.g., electrically connected, electrically connected such that current flows in one direction, electrically connected such that current flows in both directions, physically connected) to one another. The power source inputs can be 1.5 V DC, 2.7 V DC, 3 V DC, 3.3 V DC, 5 V DC, 6 V DC, 7.5 V DC, 9 V DC, 12 V DC, or any combination thereof. The combined input power for the power sources 101 can be between about 70 watts and about 100 watts. The first power source 101a and the second power source 101b can have different voltages. The first power source 101a and the second power source 10b can have the same voltages. The power source 101 can include car alternators, AC power, solar panels, wind turbines, other DC power sources, fixed lines, AC to DC converters from fixed lines, power generators, other alternative energy sources, or any combination thereof.

The satellite navigation receiver can be a global positioning system chip, a global positioning system receiver, a global positioning system transmitter, for example, global positioning system (GPS) transmitter 227. The GPS transmitter 227 can be connected to a device 200 (e.g., a load, a portable video security unit). The GPS transmitter can be connected to the first battery charge block 222 and/or the second battery charge block 223. The GPS transmitter can be located between the first battery charge block 222 and the second battery charge block 223. The GPS transmitter 227 can track the location of the power management system 100 and/or the device 200. The location of the GPS transmitter 227 can be displayed on any computer, browser, mobile device, application, graphical user interface supported by the GPS transmitter 227, or any combination thereof. The GPS transmitter 227 can be powered by the power source 101, a first battery 206, a second battery 213, or any combination thereof.

The thermal control 225 can be powered by the power source 101, the first battery 206, the second battery 213, or any combination thereof. The thermal control 225 can have sensors. The sensors can detect the temperature of the power management system 100 and/or the device 200.

The cooling elements 226 can be connected to the thermal control 225. The cooling elements 226 can be thermoelectric peltier cooling modules, piezo-electric plates, fans, liquid, gel, or any combination thereof. The cooling element 226 can be activated based on the settings of the thermal control 225.

Figure 3A:
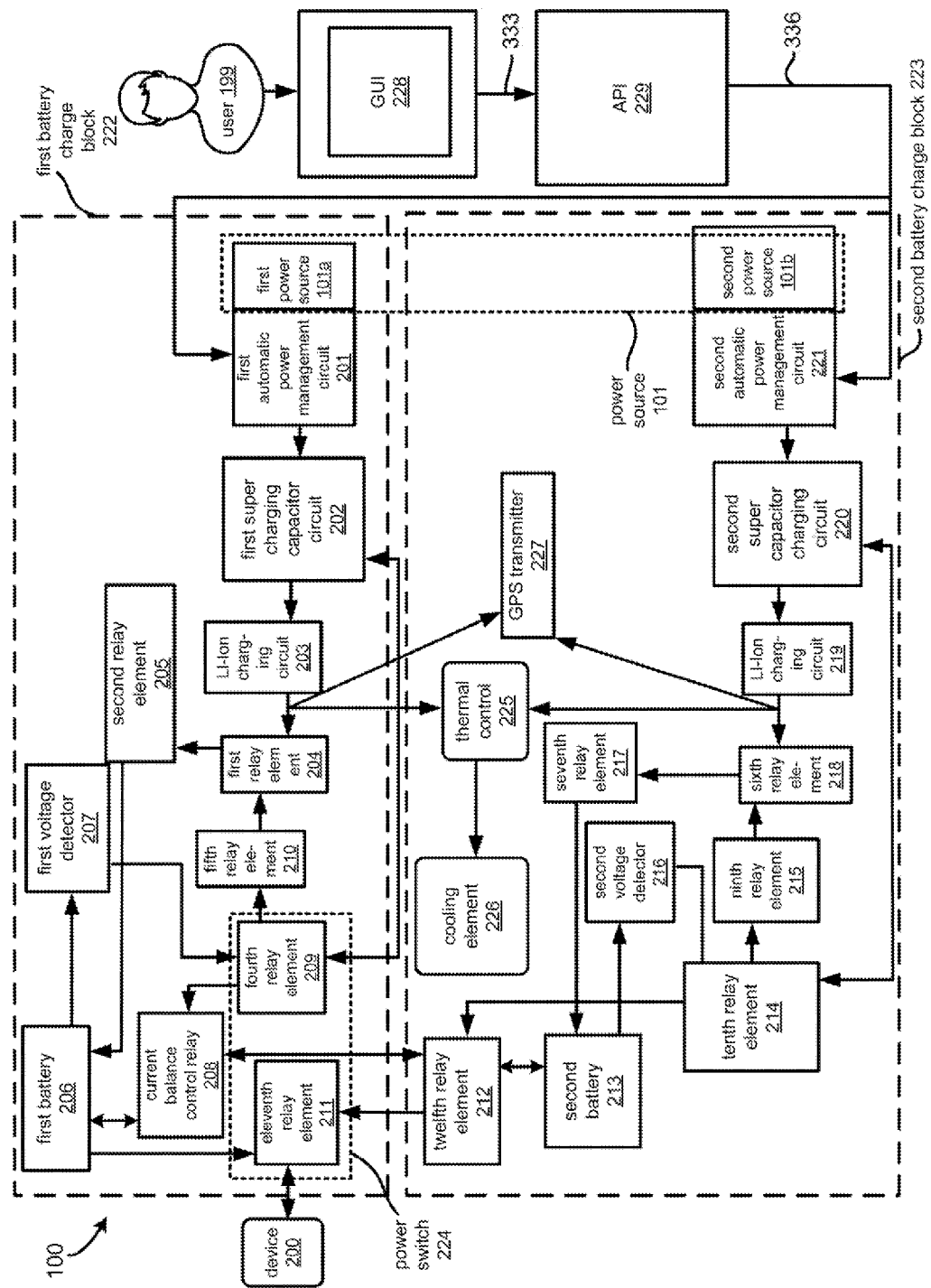
FIG. 3a illustrates a variation of the method in which the power source is selected manually.

The power switch block 224 can have an eleventh relay element 211 and/or a fourth relay element 209 as shown in FIG. 3a. The power switch block 224 can be connected to the device 200. The power switch block 224 can control the current flow of the first battery 206 and/or the current flow of the second battery 213 into the device 200.

The power management system 100 can have at least one, two, three, four, five, or more batteries. The first battery 206 and the second battery 213 can be connected to the power switch block 224 and/or relay elements. The battery voltage can be about 1.5 V, about 2.7 V, about 3 V, about 3.3 V, about 5 V, about 6 V, about 7.5 V, about 9 V, about 12 V, or any combination thereof. The first battery 206 can have a first battery voltage. The second battery 213 can have a second battery voltage. The first battery voltage can be the same as the second battery voltage. The first battery voltage can be different than the second battery voltage. For example, the first battery can be 12 V while the second battery can be 2.7 V. The first battery 206 can be 12 V and the second battery 213 can be 12 V. The battery can be a 12 V Li-Ion battery.

The first battery charge block 222 can have a first automatic power management circuit 201. The first automatic power management circuit 201 can be connected to the power source 101. The first automatic power management circuit 201 can manage multiple input power sources 101. The first automatic power management circuit 201 can have a logic table control method. The logic table control method can select at least one or more power sources 101. The first automatic power management circuit 201 can continuously charge batteries 206,213 and/or capacitor banks 300. For example, the first automatic power management circuit 201 can combine multiple power sources 101 to charge batteries 206,213 and/or capacitor banks 300. The first automatic power management circuit 201 can regulate the power to the device 200.

The first battery charge block 222 can have a first super charging circuit 103. The first super charging circuit 103 can have a first super capacitor charging circuit 202 and/or a first Li-Ion charging circuit 203. The output of the super capacitor charging circuit 202 can be connected to the input of the Li-Ion charging circuit 203. The first super charging circuit 103, the first super charging capacitor circuit 202, the first Li-Ion charging circuit 203, or any combination thereof can be connected to the automatic power management circuit 201, the GPS transmitter 227, the thermal control 225, the first battery 206, or any combination thereof.

The first super charging circuit 103 can immediately store current into capacitors 302 (e.g., capacitors designed for rapid charge and discharge of current, supercapacitors, ultracapacitors) from the power source 101. The first super charging circuit 103 can rapidly charge and discharge current from the capacitors 302. The first super charging circuit 103 can charge and/or discharge current in increments of 1 V DC, 2 V DC, 2.7 V DC, 3 V DC, or any combination thereof. The first super charging circuit 103 can provide constant discharge of current to the first battery 206. For example, the super charging circuit 103 can store output power into 12 V DC li-Ion batteries and 2.7 V DC capacitors concurrently. The super charging circuit 103 can charge and/or store energy with combined input power from about 70 watts to about 100 watts.

The first super charging circuit 103, the first super charging capacitor circuit 202, the first Li-Ion charging circuit 203, or any combination thereof can send current (e.g., output current) (concurrently when sending current to the capacitors 302 and/or battery 206) to the GPS transmitter 227 and/or the thermal control 225.

The first battery charge block 222 can have a first current balance management circuit 105. The first current balance management circuit 105 can be connected to the first super charging circuit 103 and/or the power switch block 224. The first current balance management circuit 105 can have a first relay element 204, a second relay element 205, a third relay element (e.g., a first voltage detector 207), a fourth relay element 209, a fifth relay element 210, or any combination thereof. The relay elements can be connected to one another. The relay elements can be connected to the first super charging circuit 103 or any other component of the power management system 100.

The first battery charge block 222 can have a first voltage detector 207. The first voltage detector 207 can be a low voltage detector. The first voltage detector 207 can be connected to the first current balance management circuit 105, the first battery 206, any relay element, or any combination thereof. The first voltage detector 207 can be connected before or after the first current balance management circuit 105. The first voltage detector 207 can be connected before or after the first super charging circuit 103. The first voltage detector 207 can be connected before or after the first automatic power management circuit 201. The first voltage detector 207 can be connected after the power source 101. The first voltage detector 207 can detect voltage. The first voltage detector 207 can detect voltage from the first battery 206. The first voltage detector 207 can have a set reference voltage (described below). The first voltage detector 207 can display the voltage and/or the current on a display screen.

The first battery charge block 222 can have a first output switch. The voltage detector can have the first output switch. The power switch can have the first output switch. The first output switch can enable or disable charging of the battery. The output switch can have a set reference voltage.

The power management system 100 can have current sensors. The current sensors can detect the current. The current sensors can be located before the automatic power management circuit 201. The current sensor can be located before or after the current management circuit 105.

The second battery charge block 223 can have a second automatic power management circuit 221, a second supercharging circuit 109, a second current balance management circuit 110, or any combination thereof. The second automatic power management circuit 221 can have a sixth relay element 218, a seventh relay element 217, an eighth relay element (e.g., a second voltage detector 216), a ninth relay element 215, a tenth relay element 214, a second output switch, or any combination thereof. The components of the second battery charge block 223 can be similar to the components of the first battery charge block 222.

The first battery charge block 222 can be the primary charge block. The first battery charge block 222 can be the secondary charge block. The second battery charge block can be the primary charge block. The second battery charge block 223 can be the secondary charge block. The first battery charge block 222 and the second battery charge block 223 can be on the same electronic board. The first battery charge block 222 and the second battery charge block 223 can be on different electronic boards. For example, the first automatic power management circuit 201, the first supercharging circuit 103, the first current balance management circuit 105, the first voltage detector 207, or any combination thereof can be on a first electronic board. The second automatic power management circuit 221, the second supercharging circuit 109, the second current balance management circuit 110, the second voltage detector 216, or any combination thereof can be on a second electronic board. The power source 101, cooling element 226, thermal control 225, the GPS transmitter 227, the power switch block 224, the first battery 206, the second battery 213, the device 200, or any combinations thereof can be on the first electronic board, the second electronic board, a third electronic board, or any combination thereof. The power source 101, cooling element 226, thermal control 225, the GPS transmitter 227, the power switch block 224, the first battery 206, the second battery 213, the device 200, or any combinations thereof can be connected to the first battery charge block 222 and/or the second battery charge block 223.

The current balance management circuits 105, 110 can control the current. The current balance management circuits 105, 110 can generate current and voltage levels to match the logic table conditions. The current balance management circuits 105, 110 can balance current discharge between the first battery 206 and the second battery 213. When the power source 101 is unavailable and both the first battery 206 and the second battery 213 are below the set reference voltages (e.g., full battery voltage, optimal battery voltage), the current balance management circuits 105, 110 can cascade and/or combine battery current to power the device 200. For example, if there is insufficient energy from the power source 101, then the current balance management circuits 105, 110 can switch to the first battery 206 to power the device 200. If the first battery 206 is below the set reference voltage, then the current balance management circuits 105, 110 can switch to the second battery 213 to power the device 200. If the second battery 213 then falls below the set reference voltage, then the remaining current from the first battery 206 and the second battery 213 can be combined to provide power to the device 200.

The set reference voltage can be from about 0 V to about 12 V, for example, about 1 V, about 2 V, about 3 V, about 4 V, about 5 V, about 6 V, about 7 V, about 8 V, about 9 V, about 10 V, about 11 V, or about 11.5 V. The set reference voltage can be different for the first battery 206 and the second battery 213. The set reference voltage can be the same for the first battery 206 and the second battery 213.

Figure 2A:
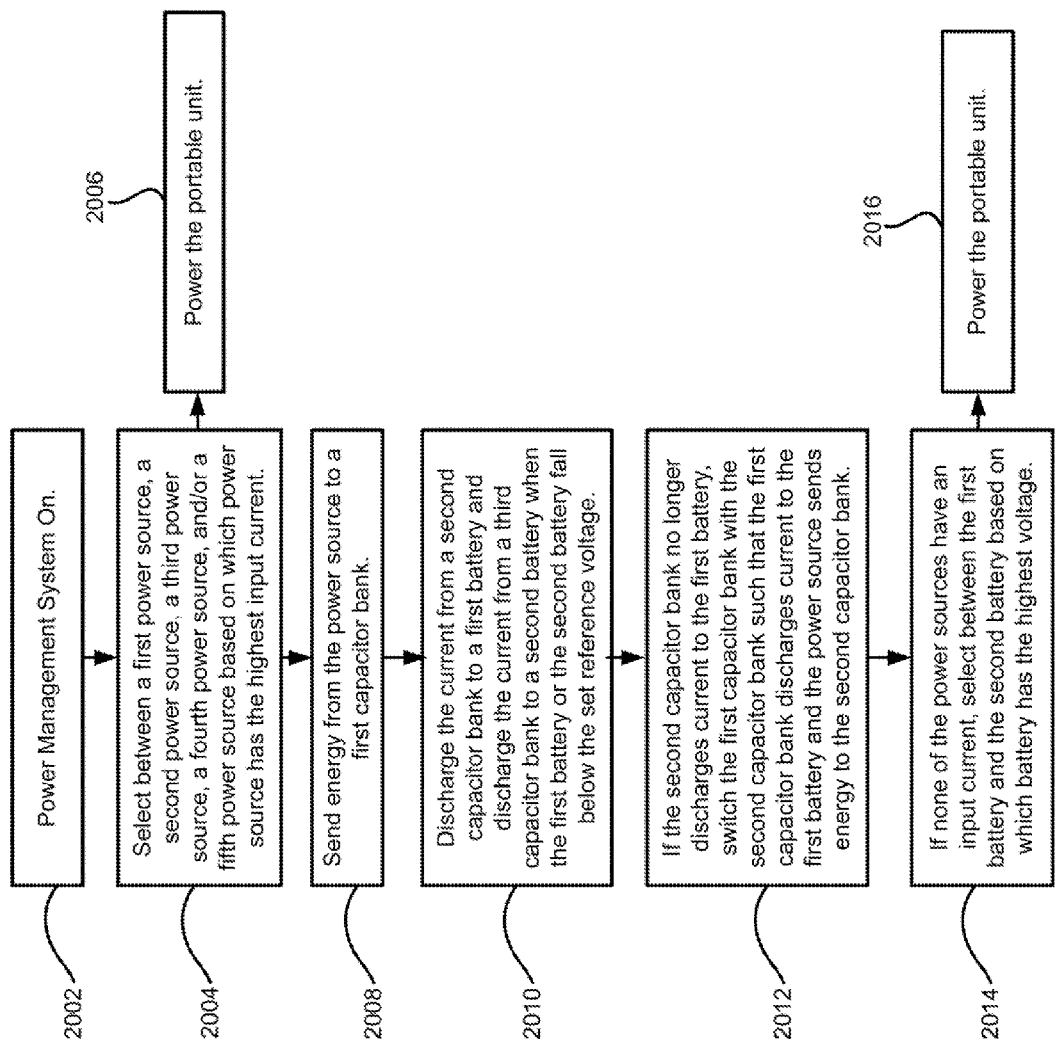
FIG. 2a illustrates a variation of a flowchart describing the method to charge and store energy of the portable power management system.
Figure 2C:
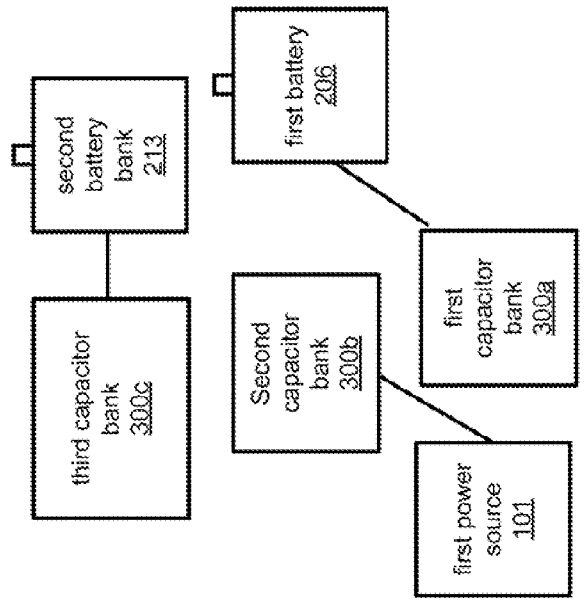
FIGS. 2b and 2c illustrate a variation of rotating the capacitor banks to charge the batteries.
Figure 2B:
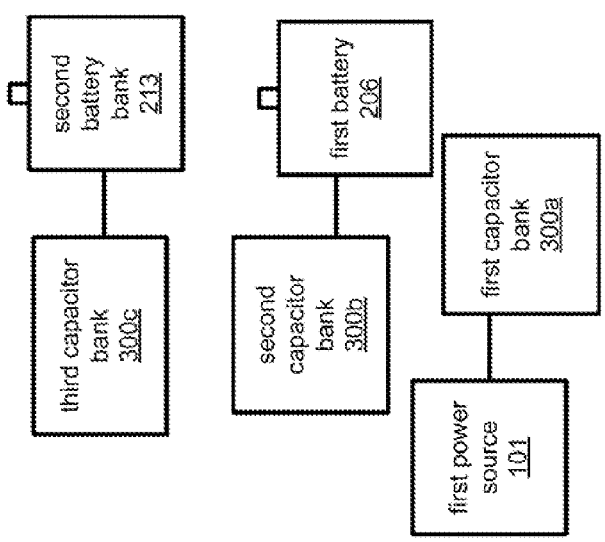

FIG. 2a illustrates that when the power management system 100 is activated in block 2002, the power management system 100 can select between the power sources 101a or 101b based on which power source has the highest input current (e.g., optimal input current) in block 2004. The power source 101 can directly power the device 200 in block 2006. Concurrently, the power management system 100 can send energy from the power source 101 to a first capacitor bank 300a in block 2008. At the same time or at a different time of sending energy from the power source 101 to a first capacitor bank 300a, the power management system 100 can discharge the current from a second capacitor bank 300b to the first battery 206 as shown in FIG. 2b when the first battery 206 voltage falls below the set reference voltage. At the same time or at a different time, the power management system 100 can discharge the current from a third capacitor bank 300c to the second battery 213 as shown in FIG. 2c when the second battery 213 falls below the set reference voltage in block 2010. If the second capacitor bank 300b no longer discharges current to the first battery 206 or falls below a capacitor bank threshold (e.g., optimal capacitor voltage) the power management system 100 can switch the first capacitor bank 300a with the second capacitor bank 300b such that the first capacitor bank 300a discharges current to the first battery 206 and the power source 101 sends energy to the second capacitor bank 300b as shown in FIG. 2c in block 2012. If none of the power sources 101 have an input current, the power management system 100 can select between the first battery 206 and/or the second battery 213 based on which battery has the highest voltage in block 2014 to power the device 200 in a block 2016. The power management system 100 can constantly (e.g., continuously, uninterrupted) charge the batteries and the capacitors. The power management system 100 can constantly power the device 200. The capacitor bank threshold can be between 0 V to about 3 V, for example, about 1 V, about 2 V, about 2.5 V, or about 3 V.

Any one component or a combination of components can achieve such a result. For example, the automatic power management circuits 201, 221 can select the power source 101 with the highest input. The super charging circuits 103, 109 can send energy from the power source 101 to the capacitor bank 300. The current management circuits 105, 110 can manage the power to the device 200.

FIG. 3a illustrates that the power management system 100 can have a manual override circuit (MOC). The MOC can be within the automatic power management circuits 201, 221. As shown in FIG. 3a, the power management system 100 can allow a user 199 to manually select the power source 101. The user 199 can use a graphical user interface (GUI) 228 to select the power source 101. The GUI 228 can send a software command to an application programming interface (API) 229 through connection 333. The API 229 can create a low level I/O control signal. The API 229 can send the low level I/O control signal to the automatic management circuits 201, 221 through connection 336. The automatic management circuits 201, 221 can activate the manual override circuit to select the power source 101. The MOC can disable (e.g., override) the auto-select of the automatic power management circuits 201, 221.

Figure 3B:
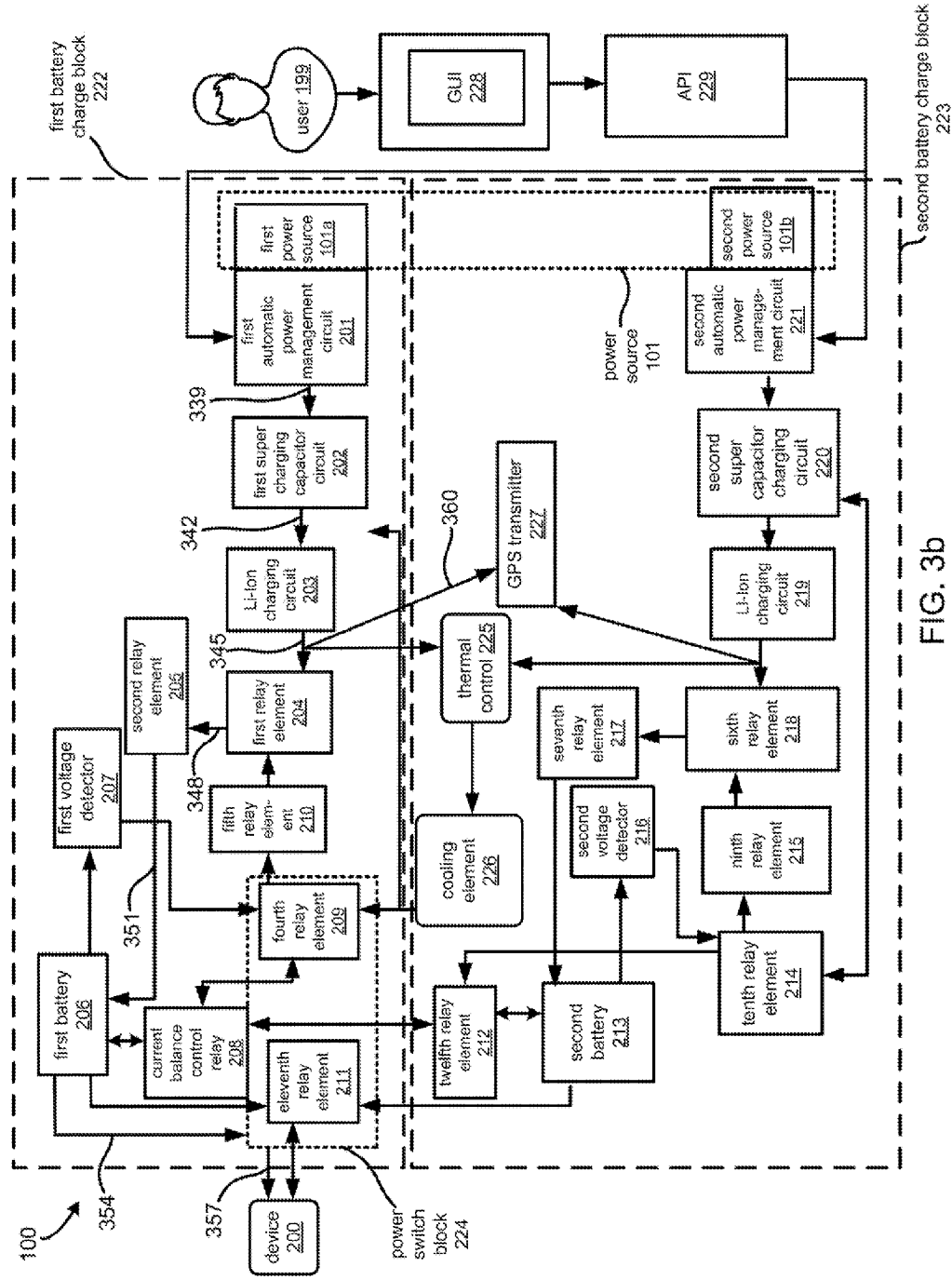
FIG. 3b illustrates a variation of the method in which the power source is selected automatically on the first battery charge block.
Figure 3C:
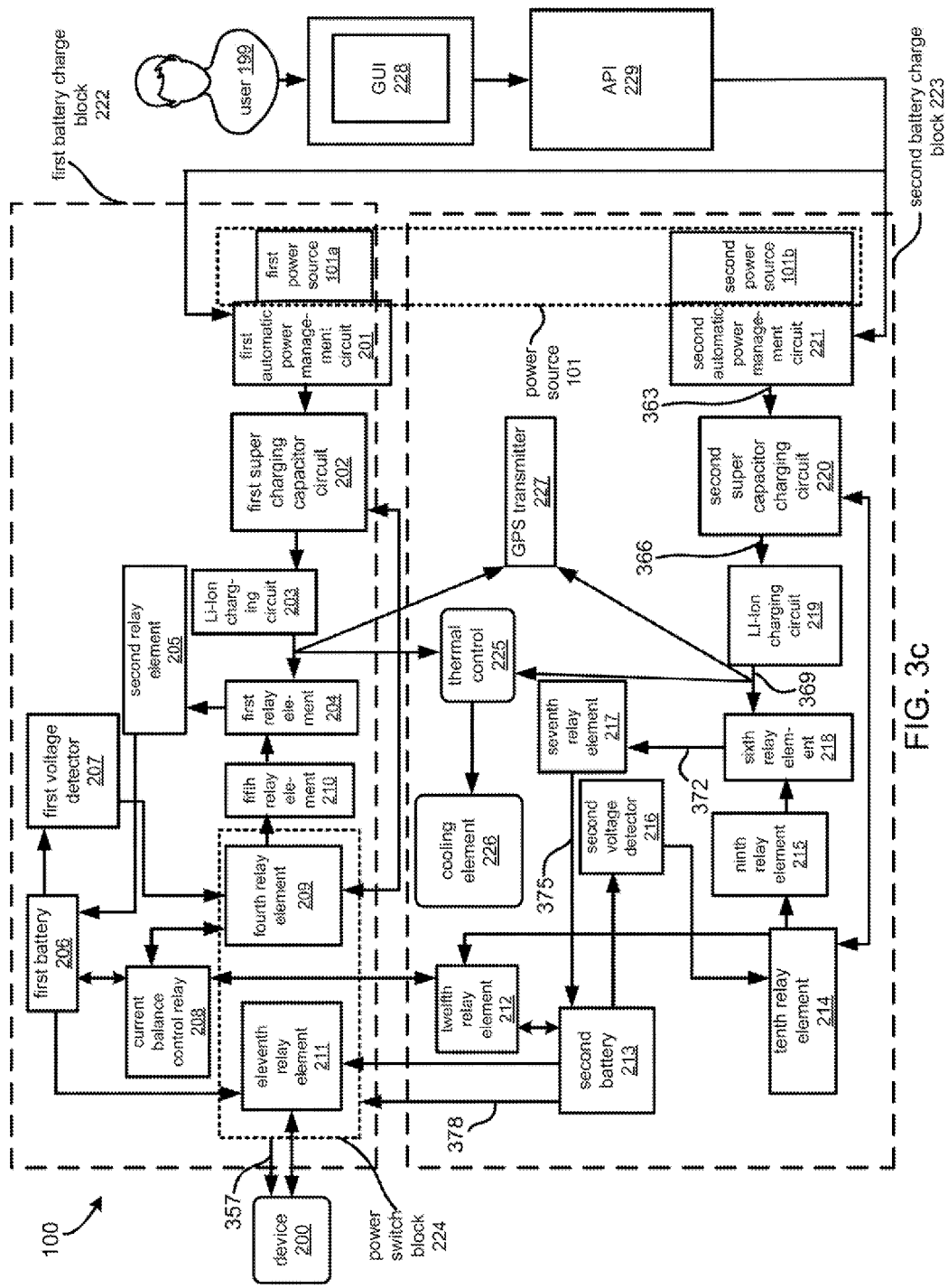
FIG. 3c illustrates a variation of the method in which the power source is selected automatically on the second battery charge block.

FIG. 3b and FIG. 3c illustrate that the power management system 100 can select the power source 101 with the highest input current. The automatic power management circuits 201, 221 can continuously determine the input current of each power sources 101a, 101b. The automatic power management circuits 201, 221 can periodically determine the input current of each power source 101a, 101b. For example, the automatic power management circuits 201, 221 can determine the input current of the power sources 101a, 101b about every 1 minute, 2 minutes, 30 minutes, 45 minutes, or 1 hour. The power source 101 selected by the automatic power management circuits 201, 221 can charge the first battery 206, the second battery 213, the device 200, or any combination thereof.

FIG. 3b illustrates that the power sources 101a, 101b can be connected to an input of the automatic power management circuit 201. The power source 101 can send current to the automatic power management circuit 201. The current from the first automatic power management circuit 201 can be sent to the first super capacitor charging circuit 202, for example, through connection 339. The first super capacitor charging circuit 202 can store the current from the power source 101. The first super capacitor charging circuit 202 can discharge current to the LI-Ion charging circuit 203, for example through connection 342. The LI-Ion charging circuit 203 can trigger the first relay element 204, for example through connection 345. The first relay element 204 can switch the current to the fourth relay element 209. The first relay element 204 can send the current to the first battery 206, for example through connection 348 and connection 351. The first battery 206 can send current to the power switch block 224 through connection 354. The power switch block 224 can send power to the device 200 through connection 357. The power source 101 can power the GPS transmitter 227, for example, through connection 342 and connection 360.

FIG. 3c illustrates that the power sources 101a, 101 b can be connected to an input of the second automatic power management circuit 221. The power source 101 can send current to the second automatic power management circuit 221. The current from the second automatic power management circuit 221 can be sent to the second super capacitor charging circuit 220, for example, through connection 363. The second super capacitor charging circuit 220 can store the input current from the power source 101. The second super capacitor charging circuit 220 can discharge current to the LI-Ion charging circuit 219, for example, through connection 366. The LI-Ion charging circuit 219 can trigger the sixth relay element 218, for example, through connection 369. The sixth relay element 218 can switch the current via the ninth relay element 215. The sixth relay element 218 can send the current to the second battery 213, for example, through connection 372 and connection 375. The second battery 213 can send current to the power switch block 224, for example, through connection 378. The power switch block 224 can send power to the device 200, for example, through connection 357.

Figure 4:
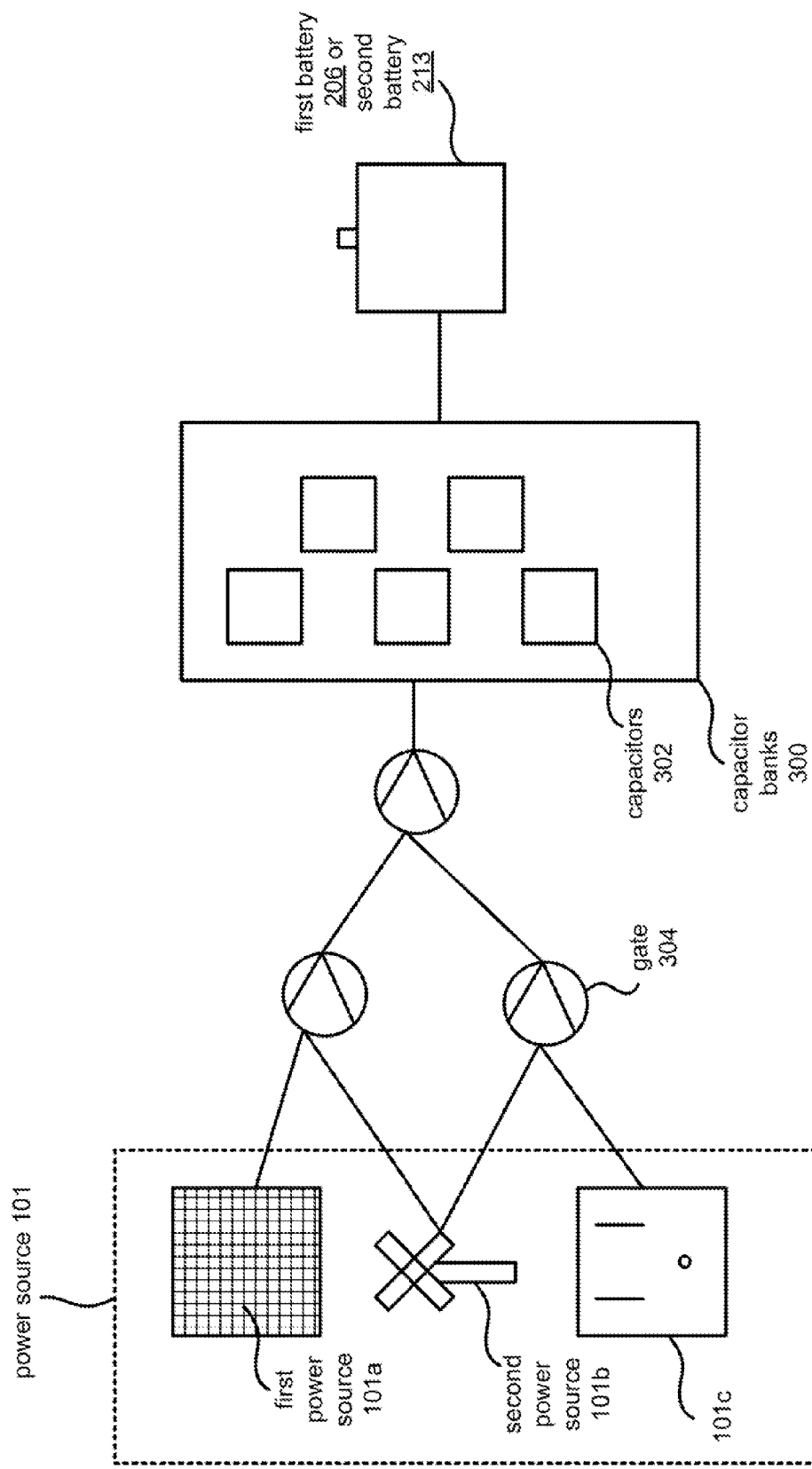
FIG. 4 illustrates a variation of the power source charging the battery.

FIG. 4 illustrates the power sources 101a, 101b, 101c, the gate 304, the capacitors 302, the capacitor bank 300, the batteries 206, 213, or any combination thereof. The power source 101 can be solar panels, wind turbines, or a fixed line.

The power source 101 can send current to the gate 304. The gate 304 can send the current from the power source 101 to the capacitor bank 300. The gate 304 can be a microprocessor. The gate 304 can be a switch. The gate 304 can be logic gates such as comparators as described below. The gate 304 can have relay elements. The gate 304 can compare the currents of the power sources 101. The gate 304 can select the power source 101 with the highest current.

The power management system 100 can have at least one, two, three, four, five, or more capacitor banks 300. The capacitor bank 300 can have at least one, two, three, four, five, six or more capacitors 302. The capacitor bank 300 can have a total voltage between about 1 V and 16.2 V, for example, about 2.7 V, about 5.4 V, about 8.1 V, about 13.5 V, or about 16.2 V. The capacitor banks 300 can have the same voltages or different voltages. The capacitors 302 can have a voltage between about 0.5 V and about 6 V, for example, about 1 V, about 2.7 V, about 3 V, or about 6 V. The capacitors 302 can have the same voltages or different voltages. For example, the power management system 100 can have a first capacitor bank 300a, a second capacitor bank 300b, and a third capacitor bank 300c. Each capacitor bank 300 can have five 2.7 V capacitors 302. The capacitors can be connected in series. The capacitors can be connected in parallel. The capacitor bank 300 can discharge the current to the batteries 206, 213. The capacitor bank 300 can send the current to a voltage divider and/or a voltage limiter. The voltage divider and/or the voltage limiter can send the current to the batteries 206, 213.

Figure 5:
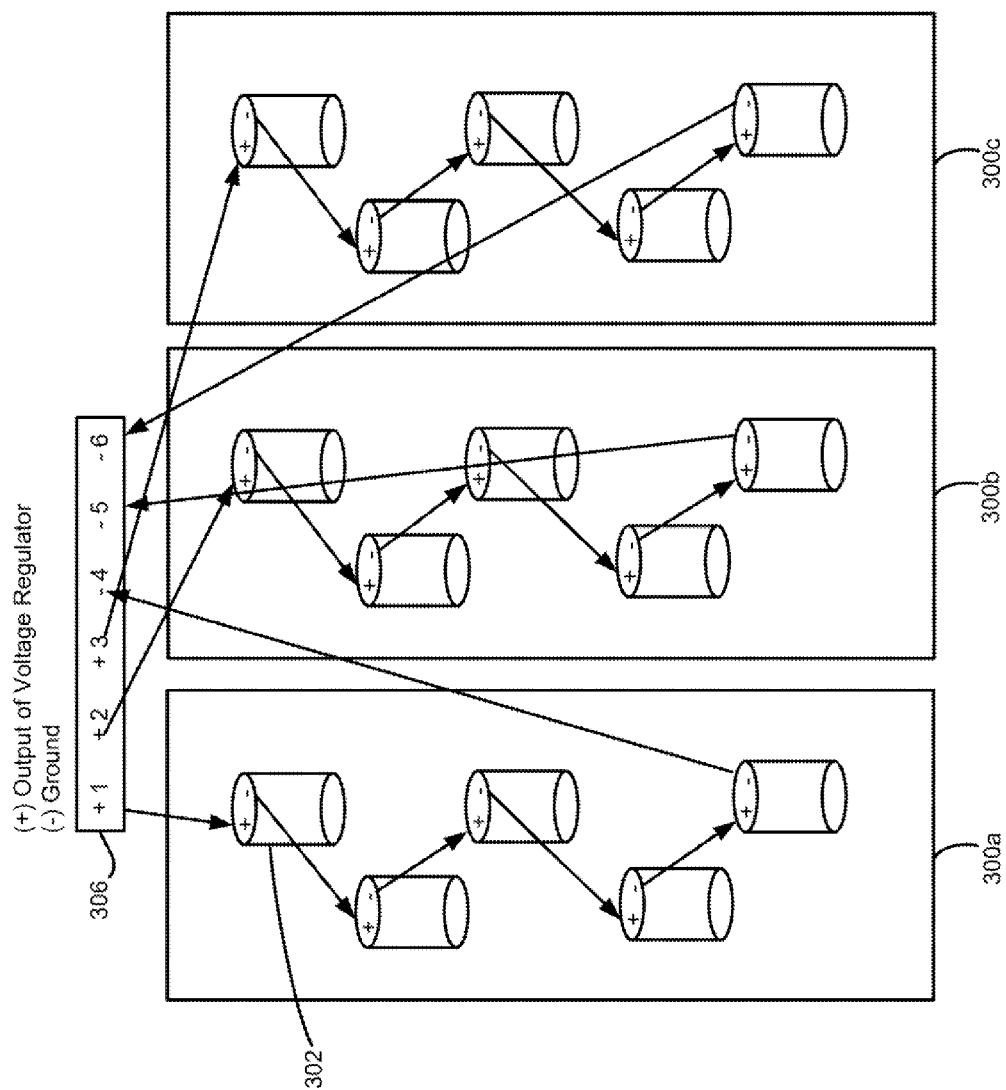
FIG. 5 illustrates a variation of the physical connections of the capacitor banks.

FIG. 5 illustrates that the power management system 100 can have a voltage regulator 306. The capacitor 302 can be connected to the output of the voltage regulator 306. The capacitors 302 in each of the capacitor banks 300 can be connected in series. The capacitors 302 in each of the capacitor banks 300 can be connected in parallel. The voltage regulator output 306 can stack output voltage level at 2.7 V dc increments. The voltage in the capacitor banks 300 can be received and/or discharged in 2.7 V DC increments.

FIGS. 6a through 9b illustrate that a power switching method can be based on the instructions in the logic tables. The instructions in the logic tables can instruct the system to auto-select the highest input current source from the multiple input power sources 101 and at the same time instruct the system to deliver constant and un-interrupted power to the device 200. The logic table can show the status (e.g., read system status) of the first battery 206, the second battery 213, the first switch S1, the second switch S2, the first battery charge block 222, and the second battery charge block 223. Logic tables can be software commands in memory executed by a microprocessor in the system. Logic tables can be representative of hardware architectures such as switches (e.g., comparators such as logic gates, for example, AND gates, OR gates, NOT gates, NAND gates, NOR gates, EOR gates, ENOR gates, or combinations thereof) in the solid state of the electronics of the system such as a motherboard. The logic tables can be executed on a general purpose I/O (GIPO) circuit. The GIPO can send and receive signals to and from the power management system 100. The logic table software commands and/or the logic table hardware can be located and/or executed on the automatic power management circuits 201, 221, the current management circuits 105, 110, or any other component of the power management system 100. Logic tables can control the switches to route the current from the capacitors to the batteries. Logic tables can, for example, direct the components of the system, route current, control the elements of the system, or any combination thereof. When the battery voltage is greater than or equal to the set reference voltage, the batteries 206, 213 can be fully charged. When the battery voltage is less than or equal to the set reference voltage, the batteries 206, 213 can have a low charge.

FIG. 6a illustrates that when the first battery 206 charge is full, the first switch S1 can be turned off. When the second battery 213 charge is low, the second switch S2 can be turned on. Turning the first switch S1 off can turn off the charging of the first battery charge block 222. Turning the second switch S2 on can turn on the charging of the second battery charge block 223.

Figure 6B:
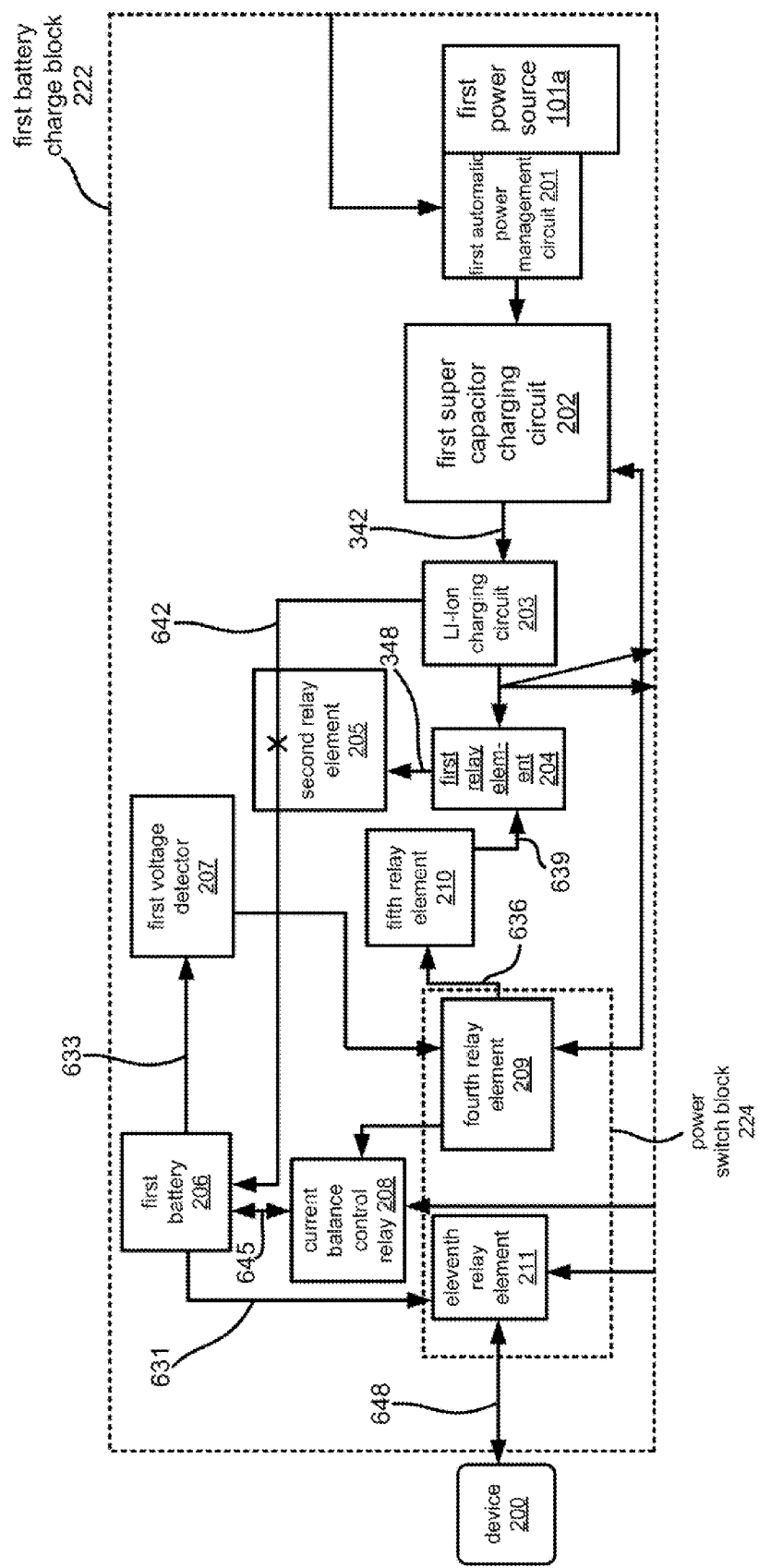
FIGS. 6b and 6c illustrate a variation of a method for charging the second battery while the first battery is not being charged.

FIG. 6b illustrates that the first battery 206 can send a voltage to the first voltage detector 207, for example, through connection 633. When the first voltage detector 207 detects a voltage above the set reference voltage, then the first output switch can be turned off. When the first output switch is turned off, the fourth relay element 209 can be disabled (e.g., triggered) from charging the first battery 206. The fourth relay element 209 can disable the fifth relay element 210, for example, through connection 636. The fifth relay element 210 can disable the first relay element 204, for example, through connection 639. The first relay element 204 can disable the second relay element 205, for example, through connection 348. While the second relay element 205 is disabled, the first super capacitor charging circuit 202 can send current to the current balance control relay 208, for example, through connection 342, connection 642, and connection 645. The current balance control relay 208 can send the current to the eleventh relay element 211, for example, through connection 645 and connection 631. The eleventh relay element 211 can send current to power the device 200, for example, through connection 648. Disable can mean to stop current flow.

Figure 6C:
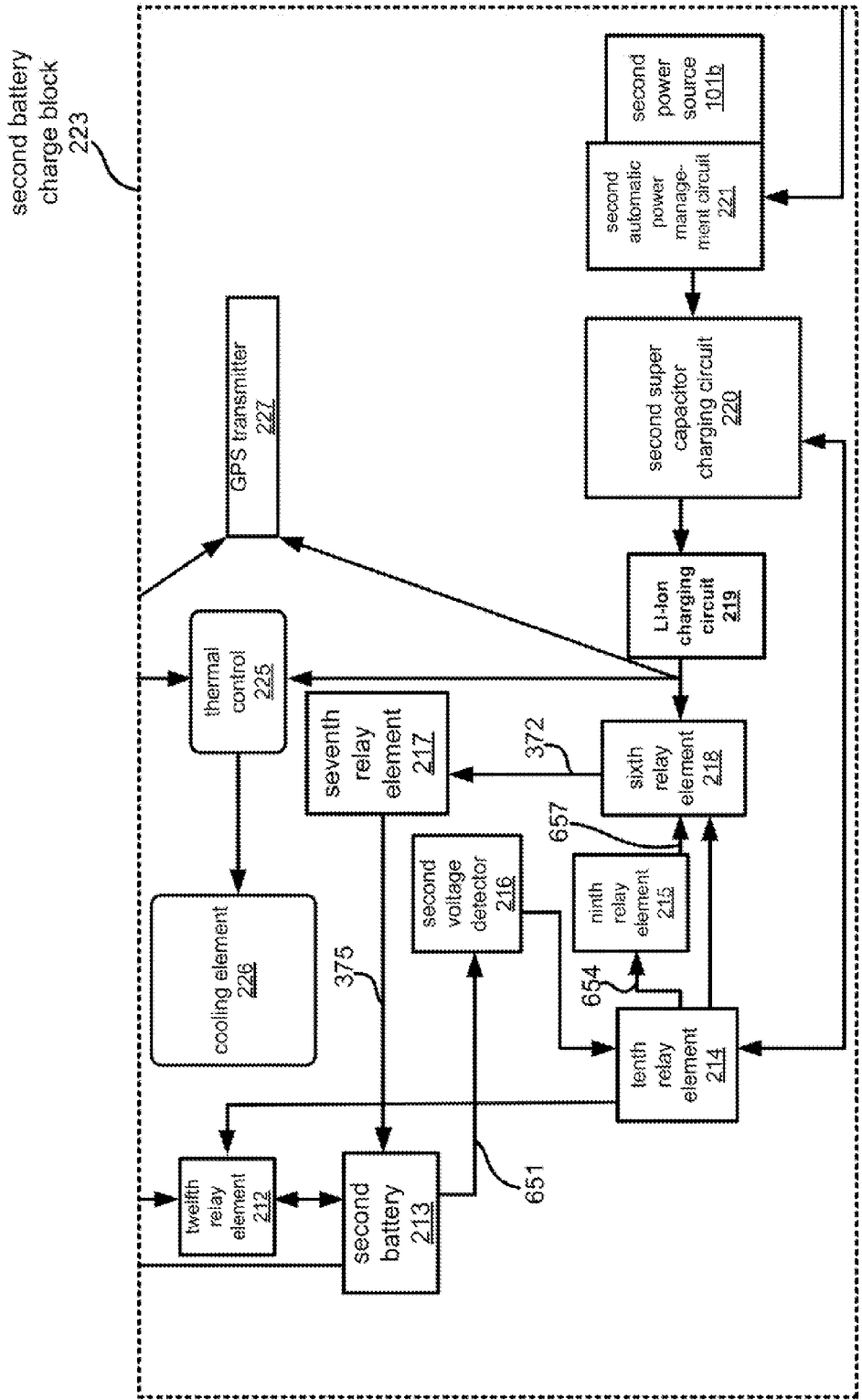

FIG. 6c illustrates that the second battery 213 can send a voltage to the second voltage detector 216, for example, through connection 651. When the second voltage detector 216 detects a voltage less than the set reference voltage, then the tenth relay element 214 can be enabled. When the tenth relay element 214 is enabled, the tenth relay element 214 can enable the ninth relay element 215, for example, through connection 654. The ninth relay element 215 can enable the sixth relay element 218 to charge the second battery 213, for example, through connection 657. The sixth relay element 218 can send current to the seventh relay element 217, for example, through connection 372. The seventh relay element 217 can send current to the second battery 213, for example, through connection 375. Enable can mean to allow current flow.

FIG. 7a illustrates that when the second battery 213 charge is full, the second switch S2 can be turned off. When the first battery 206 charge is low, the first switch S1 can be turned on. Turning the first switch S1 on can turn on the charging of the first battery charge block 222. Turning the second switch S2 off can turn off the charging of the second battery charge block 223.

Figure 7B:
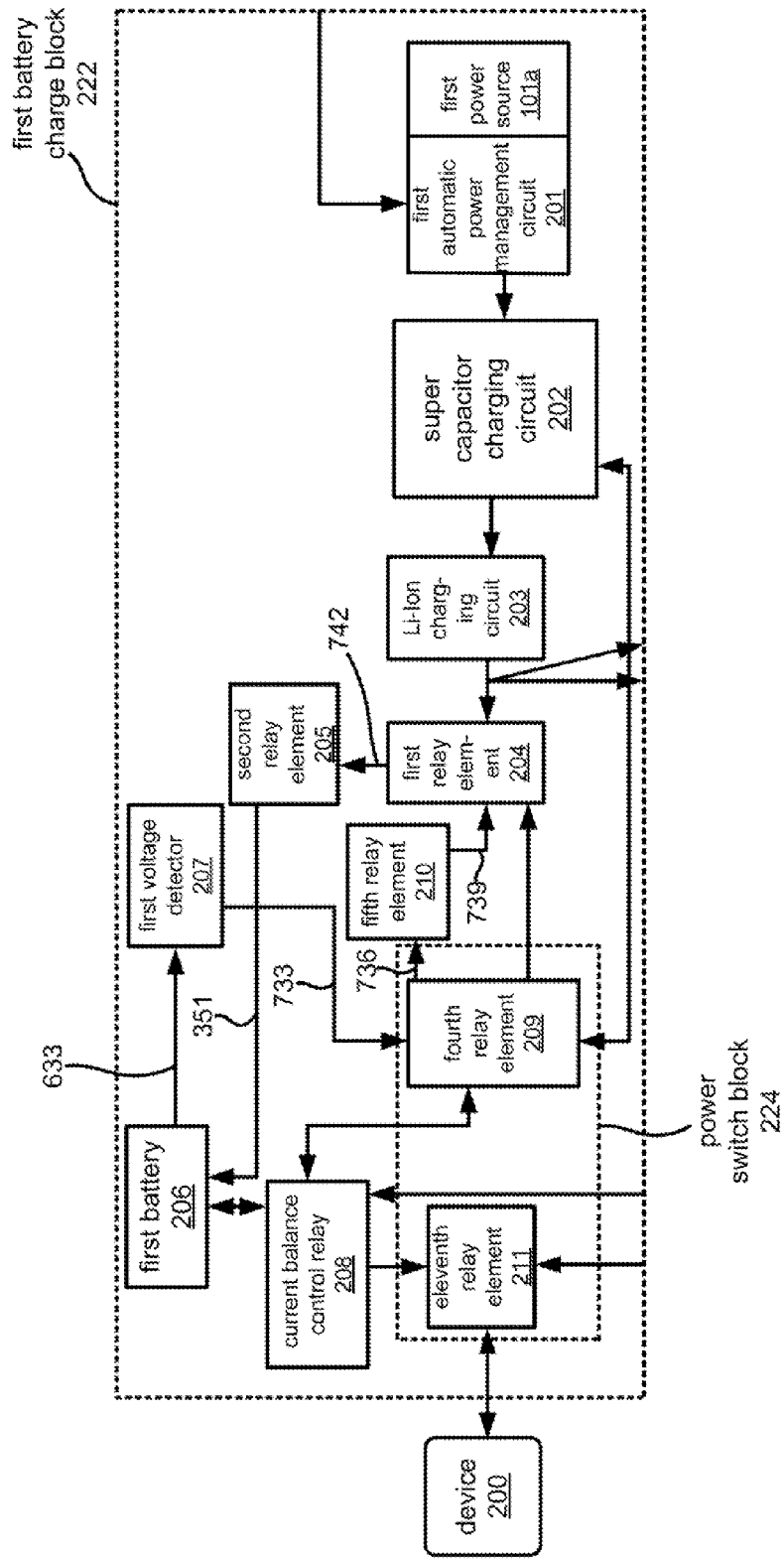
FIGS. 7b and 7c illustrate a variation of a method for charging the first battery while the second battery is not being charged.

FIG. 7b illustrates that the first battery 206 can send a voltage to the first voltage detector 207, for example, through connection 633. When the first voltage detector 207 detects a voltage less than the set reference voltage, then the fourth relay element 209 can be enabled, for example, through connection 733. When the fourth relay element 209 is enabled, the fourth relay element 209 can enable the fifth relay element 210, for example, through connection 736. The fifth relay element 210 can enable the first relay element 204, for example, through connection 739 to charge the first battery 206. The first relay element 204 can send current to the second relay element 205, for example, through connection 742. The second relay element 205 can send current to the first battery 206, for example, through connection 351.

Figure 7C:
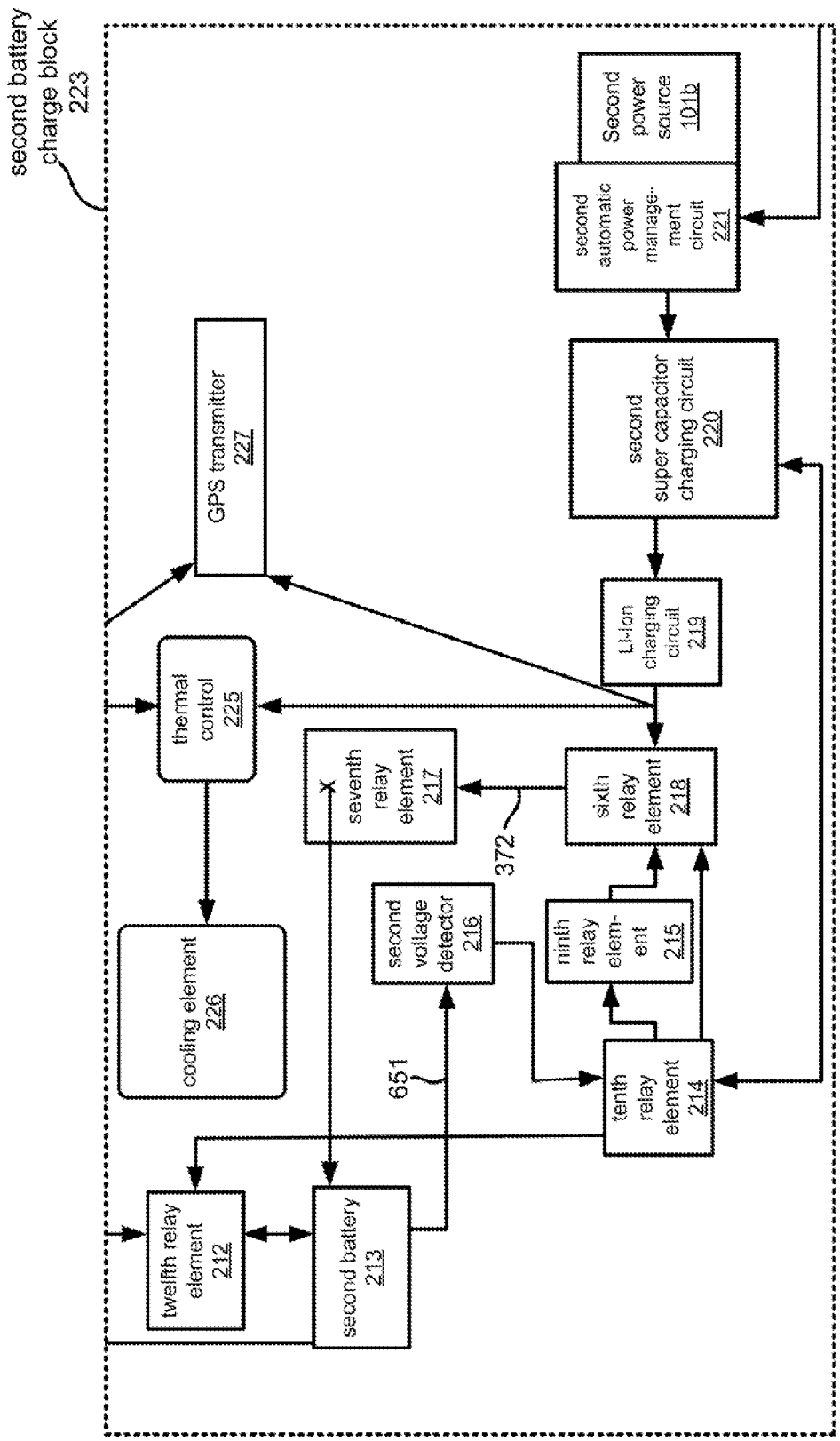

FIG. 7c illustrates that the second battery 213 can send a voltage to the second voltage detector 216, for example, through connection 651. When the second voltage detector 216 detects a voltage above the set reference voltage, then the second output switch can be turned off. When the second output switch is turned off, the tenth relay element 214 can be disabled from charging the second battery 213. The tenth relay element 214 can disable the sixth relay element 218. The sixth relay element 218 can disable the seventh relay element 217, for example, through connection 372. The seventh relay element 217 can disable the twelfth relay element 212. The twelfth relay element 212 can disable current from passing to the second battery 213. The eleventh relay element 211 can send current from the second battery 213 to power the device 200, for example, through connection 648 as shown in FIG. 6b.

FIG. 8a illustrates that when the first battery 206 charge is low, the first switch S1 can be turned on. When the second battery 213 charge is low, the second switch S2 can be turned on. Turning the first switch S1 on can turn on the charging of the first battery charge block 222. Turning the second switch S2 on can turn on the charging of the second battery charge block 223.

Figure 8B:
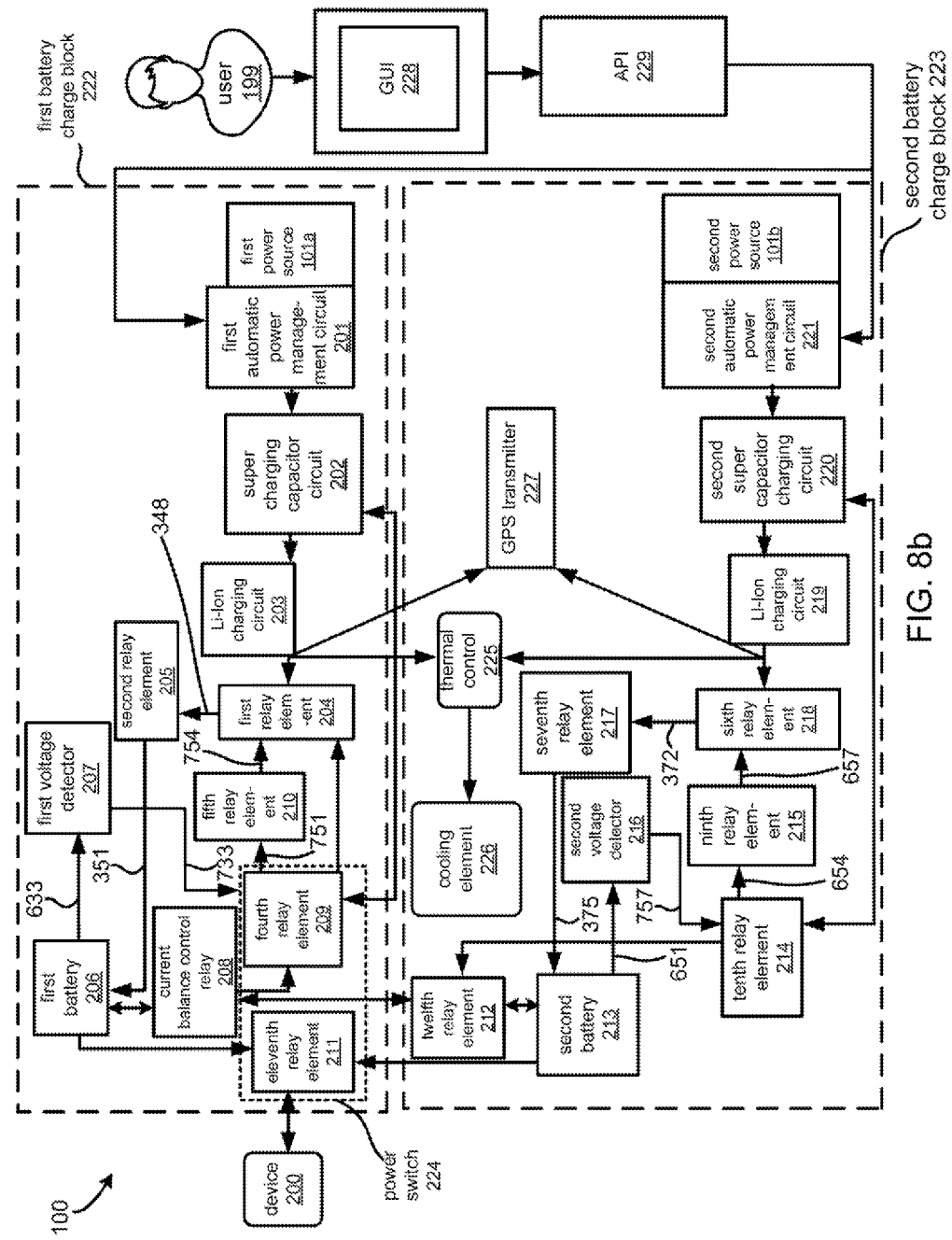
FIG. 8b illustrates a variation of a method for charging the first battery and the second battery.

FIG. 8b illustrates that the first battery 206 can send a voltage to the first voltage detector 207, for example, through connection 633. When the first voltage detector 207 detects a voltage less than the set reference voltage, then the fourth relay element 209 can be enabled, for example, through connection 733. When the fourth relay element 209 is enabled, the fourth relay element 209 can enable the fifth relay element 210, for example, through connection 751. The fifth relay element 210 can enable the first relay element 204, for example, through connection 754 to charge the first battery 206. The first relay element 204 can send current to the second relay element 205, for example, through connection 348. The second relay element 205 can send current to the first battery 206, for example, through connection 351.

The second battery 213 can send a voltage to the second voltage detector 216, for example, through connection 651. When the second voltage detector 216 detects a voltage less than the set reference voltage, then the tenth relay element 214 can be enabled, for example, through connection 757. When the tenth relay element 214 is enabled, the tenth relay element 214 can enable the ninth relay element 215, for example, through connection 654. The ninth relay element 215 can enable the sixth relay element 218, for example, through connection 657, to charge the second battery 213. The sixth relay element 218 can send current to the seventh relay element 217, for example, through connection 372. The seventh relay element can send current to the second battery 213, for example, through connection 375.

The first battery 206 and the second battery 213 can charge at the same time. The first battery 206 and the second battery 213 can charge at a different time.

FIG. 9a illustrates that when the first battery 206 charge is full, the first switch S1 can be turned off. When the second battery 213 charge is full, the second switch S2 can be turned off. Turning the first switch S1 off can turn off the charging of the first battery charge block 222. Turning the second switch S2 off can turn off the charging of the second battery charge block 223.

Figure 9B:
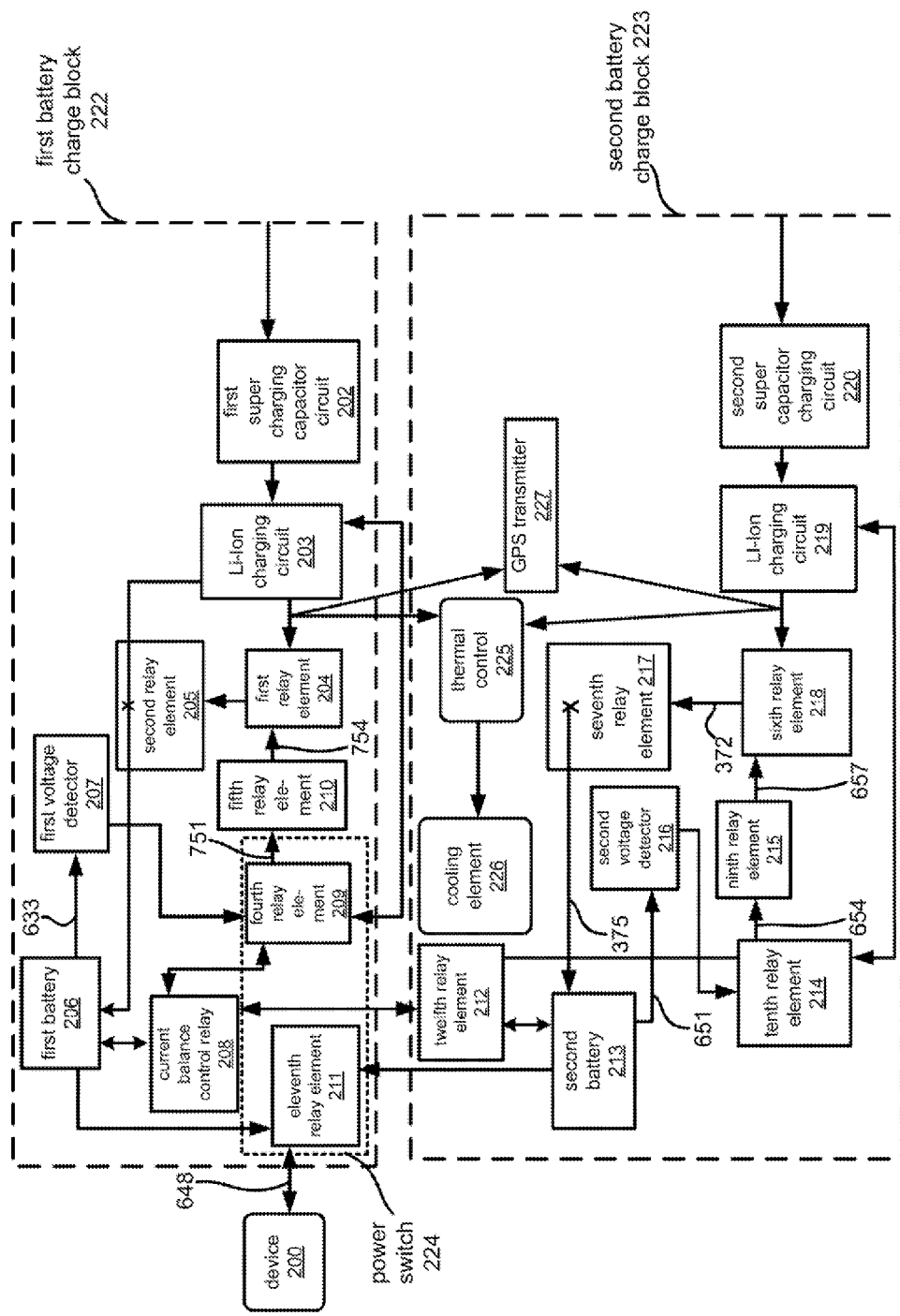
FIG. 9b illustrates a variation of a method for not charging the first battery and the second battery.

FIG. 9b illustrates that the first battery 206 can send a voltage to the first voltage detector 207, for example, through connection 633. When the first voltage detector 207 detects a voltage above the set reference voltage, then the output switch can be turned off. When the output switch is turned off, the fourth relay element 209 can be disabled from charging the first battery 206. The fourth relay element 209 can disable the fifth relay element 210, for example, through connection 751. The fifth relay element 210 can disable the first relay element 204, for example, through connection 754. The first relay element 204 can disable the second relay element 205. While the second relay element 205 is disabled, the first super capacitor charging circuit 202 can send current to the current balance control relay 208. The current balance control relay 208 can send the current to the eleventh relay element 211. The eleventh relay element 211 can send current to power the device 200, for example, through connection 648.

At the same time or at a different time, the second battery 213 can send a voltage to the second voltage detector 216, for example, through connection 651. When the second voltage detector 216 detects a voltage above the set reference voltage, then the second output switch can be turned off. When the second output switch is turned off, the tenth relay element 214 can be disabled from charging the second battery 213. The tenth relay element 214 can disable the ninth relay element 215, for example, through connection 654. The ninth relay element 215 can disable the sixth relay element 218, for example, through connection 657. The sixth relay element 218 can disable the seventh relay element 217, for example, through connection 372. The seventh relay element 217 can disable current from passing to the second battery 213, for example, through connection 375. While the seventh relay element 217 is disabled, the second super capacitor charging circuit 220 can send current to the tenth relay element 214. The tenth relay element 214 can send the current to the eleventh relay element 211. The eleventh relay element 211 can send current to power the device 200, for example, through connection 648.

Figure 10A:
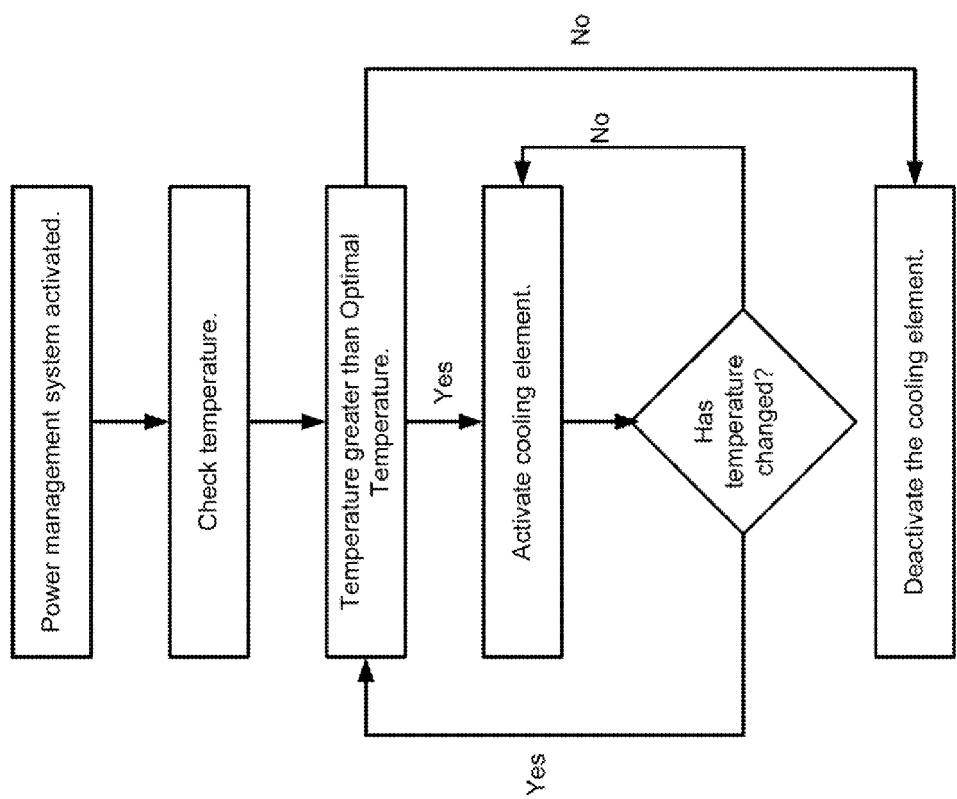
FIGS. 10a and 10b illustrate a variation of the flowchart and block diagram of the automatic temperature management circuit.

FIG. 10a illustrates that when the power management system 100 is activated, the thermal control 225 can check the temperature of the device 200 and/or the power management system 100. The thermal control 225 can check the temperature with temperature sensors. If the temperature of the device 200 and/or the power management system 100 is greater than an optimal temperature, then the thermal control 225 can activate the cooling element 226. The thermal control 225 can check the temperature continuously or periodically. If the temperature has changed and the temperature is less than the optimal temperature, then the thermal control 225 can deactivate the cooling element 226. If the temperature has not changed or the temperature is greater than the optimal temperature, the cooling element 226 can remain activated. The optimal temperature can be between about 50° F. and about 350° F., more narrowly, between about 60° F. and about 300° F., between about 70° F. and about 200° F., between about 80° F. and about 150° F., between about 100° F. and about 125° F., for example, about 100° F., or about 205° F. If the temperature of the device 200 and/or the power management system 100 is less than the optimal temperature, the thermal control 225 can activate a heating element. The heating element can be a heater, a heating liquid, a heating gel, a heating rod, or any combination thereof.

Figure 10B:
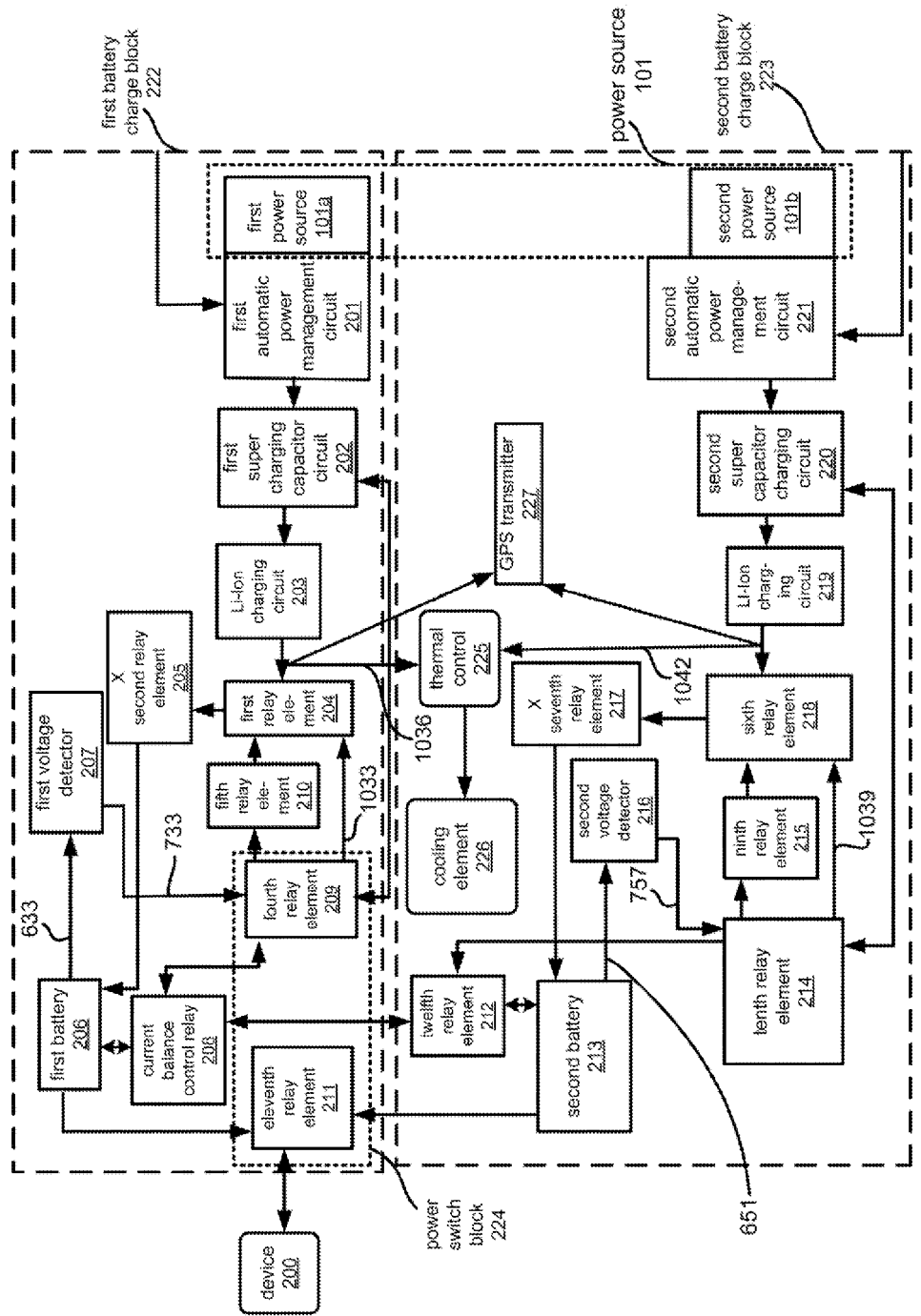

FIG. 10b illustrates that the power management system 100 can be thermo sensor controlled. The first battery 206, the second battery 213, the power source 101, or any combination thereof can power the thermal control 225, for example, through connections 633, 733, 1033, and 1036 or through connections 651, 757, 1039, and 1042.

Figure 11:
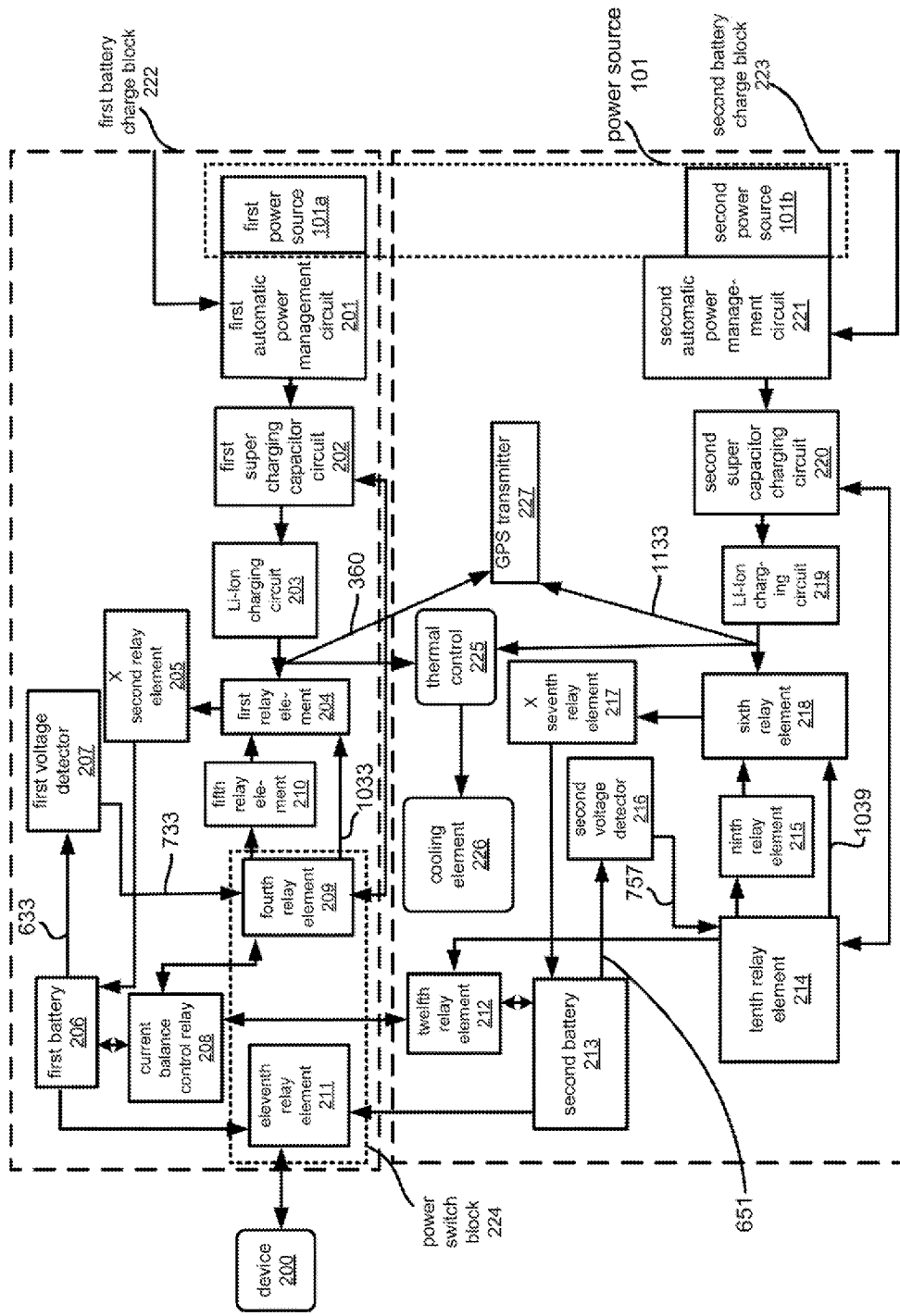
FIG. 11 illustrates a variation of the block diagram of the satellite navigation receiver.

FIG. 11 illustrates that the GPS transmitter 227 can enable the tracking of the device 200 and/or the power management system 100. The first battery 206, the second battery 213, the power source 101, or any combination thereof can power the GPS transmitter 227, for example, through connections 633, 733, 1033, and 360 or through connections 651, 757, 1039, and 1133.

The relay elements can be, but are not limited to, a relay, a switch, a current balance control, solder bridge, jumper, SPDT relay, SPST relay, SPST relay, DIP switch, pushbutton switch, SPDT toggle switch, or any combination thereof. The relay elements can be connected to any component of the first charger block 222, the second charger block 223, any other component of the power management system 100, any component mentioned in this application, or any combination thereof.

We claim:

1. A power management system comprising:
a first battery having a first battery voltage;
a second battery having a second battery voltage;
a first capacitor bank attached to the first battery;
a second capacitor bank attached to the second battery;
a power management element configured to route current from the first capacitor bank to the first battery when the first battery voltage is less than a first full battery voltage, and wherein when the current from the first capacitor bank is routed to the first battery and when the second battery voltage is less than a second full battery voltage the power management element is configured to route current from the second capacitor bank to the second battery; and
a first power source and a second power source connected to the power management element, wherein the power management element is configured to select at least one of the first power source and the second power to charge at least one of the first capacitor bank, the second capacitor bank, the first battery, and the second battery based on an input current of the at least one of the first power source and the second power source,
wherein the first and second power source initially send current to a gate, wherein the gate is at least one of a microprocessor, a switch, and a logic gate,
and wherein instructions in logic tables direct autoselection of a highest input current source from one of the first power source and the second power source.

2. The system of claim 1, further comprising a satellite navigation receiver attached to the system.

3. The system of claim 1, further comprising a power conditioning circuit, wherein the power conditioning circuit comprises a DC-to-DC converter configured to output a constant load input current and a constant load input voltage.

4. The system of claim 1, wherein the system is configured to sense the first battery voltage, the second battery voltage, the current from the first capacitor bank, and the current from the second capacitor bank.

5. The system of claim 1, further comprising a third capacitor bank, wherein the first power source is configured to deliver energy to the third capacitor bank.

6. The system of claim 1, wherein the first power source is configured to deliver energy to the first capacitor bank or the second capacitor bank.

7. The system of claim 1, wherein the first capacitor bank comprises a first capacitor having a first full capacitor voltage, a second capacitor having a second full capacitor voltage, a third capacitor having a third full capacitor voltage, a fourth capacitor having a fourth full capacitor voltage, and a fifth capacitor having a fifth full capacitor voltage, wherein the first full capacitor voltage, the second full capacitor voltage, the third full capacitor voltage, the fourth full capacitor voltage, and the fifth full capacitor voltage have the same voltage.

8. The system of claim 1, wherein the power management element comprises a microprocessor.

9. The system of claim 1, wherein the power management element comprises a comparator.

10. The system of claim 1, further comprising a voltage divider configured to send the current from the first capacitor bank to the first battery in 2.7 volt increments.

11. The system of claim 1, further comprising a voltage divider configured to send current from the second capacitor bank to the second battery in 2.7 volt increments.

12. The system of claim 1, further comprising a temperature management element and a temperature sensor, wherein the system is configured to be cooled when the system detects a temperature from the temperature sensor greater than an optimal temperature.

13. The system of claim 12, wherein the temperature management element comprises at least one of a peltier junction or a piezo-electric plate.

14. A power management system comprising:
a first capacitor bank;
a second capacitor bank;
a battery connected to at least one of the first capacitor bank and the second capacitor;

a first power source configured to deliver energy to at least one of the first capacitor bank, the second capacitor bank, and the battery;

a second power source configured to deliver energy to at least one of the second capacitor bank, the first capacitor bank, and the battery; and a power management element connected to at least one of the first power source and the second power source, wherein the power management element is configured to select at least one of the first power source and the second power source to deliver energy to at least one of the first capacitor bank, the second capacitor bank, and the battery based on an input current of the at least one of the first power source and the second power source, wherein the first and second power source initially send current to a gate, wherein the gate is at least one of a microprocessor, a switch, and a logic gate, and wherein instructions in logic tables direct auto-selection of a highest input current source from one of the first power source and the second power source.

15. The system of claim 14, further comprising a third capacitor bank, wherein the third capacitor bank is configured to receive energy from at least one of the first power source or the second power source.

16. The system of claim 14, wherein the first power source comprises at least one of a solar panel, a wind turbine, or a fixed line.

17. The system of claim 14, wherein the first capacitor bank has less than or equal to 13.5 V.

18. The system of claim 14, further comprising a satellite navigation receiver attached to the system.

19. A method for charging a first battery and a second battery:

charging a first battery with a first capacitor bank;

charging a second battery with a second capacitor bank;

receiving current from a power source to a third capacitor bank; and switching the third capacitor bank with the first capacitor bank when the first capacitor bank is less than an optimal capacitor voltage such that the first capacitor is receiving current from the power source and the third capacitor bank is charging the first battery, wherein the power source initially sends current to a gate, wherein the gate is at least one of a microprocessor, a switch, and a logic gate, and wherein instructions in logic tables direct auto-selection of a highest input current source from one of the first power source and the second power source.

20. The method of claim 19, wherein the optimal capacitor voltage is from 0 V to 2 V.

* * * * *